United States Patent [19]

Dallaire et al.

[11] Patent Number: 5,349,359
[45] Date of Patent: Sep. 20, 1994

[54] SPATIALLY VARIANT APODIZATION

[75] Inventors: Rodney J. Dallaire, Livonia; Herbert C. Stankwitz, Ann Arbor, both of Mich.

[73] Assignee: Environmental Research Institute of Michigan, Ann Arbor, Mich.

[21] Appl. No.: 58,174

[22] Filed: May 10, 1993

[51] Int. Cl.$^5$ .................................................. G01S 13/89
[52] U.S. Cl. .................................... 342/195; 342/196
[58] Field of Search .......................... 342/25, 195, 196; 324/76.37; 359/306; 250/339

[56] References Cited

U.S. PATENT DOCUMENTS

| | | | |
|---|---|---|---|
| H1181 | 5/1993 | Rihaczek | 342/25 |
| 4,030,817 | 6/1977 | Westell | 350/314 |
| 4,577,169 | 3/1986 | Meeker | 333/194 |
| 4,626,102 | 12/1986 | Storck et al. | 356/328 |
| 4,633,171 | 12/1986 | Storck et al. | 324/76.37 |
| 4,780,718 | 10/1988 | Hudson et al. | 342/25 |
| 4,784,147 | 11/1988 | Moshfeghi | 128/653 |
| 5,122,805 | 6/1992 | Peterman et al. | 342/26 |
| 5,173,706 | 12/1992 | Urkowitz | 342/195 X |

*Primary Examiner*—Mark Hellner
*Attorney, Agent, or Firm*—Krass & Young

[57] ABSTRACT

Spatially variant apodization is a digital image processing technique for eliminating sidelobes produced by Fourier transform of finite data sequences without compromising mainlobe width. This process allows each sample or pixel in an image to receive its own frequency domain aperture amplitude weighting function from an infinite number of possible weighting functions. In its simplest form the weight is a function of the negative of the current sample divided by the sum of the neighboring samples, and the function is limited to a predetermined range such as the range between zero and one half.

26 Claims, 4 Drawing Sheets

SPATIALLY VARIANT APODIZATION

FIELD OF THE INVENTION

This present invention relates to decreasing sidelobes when performing signal compression using matched filters or transforms and more particularly to the reduction of sidelobes resulting from transform of finite data sequences.

BACKGROUND OF THE INVENTION

Signal compression is a common operation which is performed in many systems, including radar. The compression is often performed as a transform of domain, such as from the time domain to the frequency domain. The accuracy of the compression is limited by the finite amount of signal that can be collected. In the case of imaging radars, a signal consists of one or more sine waves in time that must be transformed into the spatial domain in order to determine their frequency, magnitude, and sometimes phase. The most common method for transformation is the Fourier transform.

Figure 1:
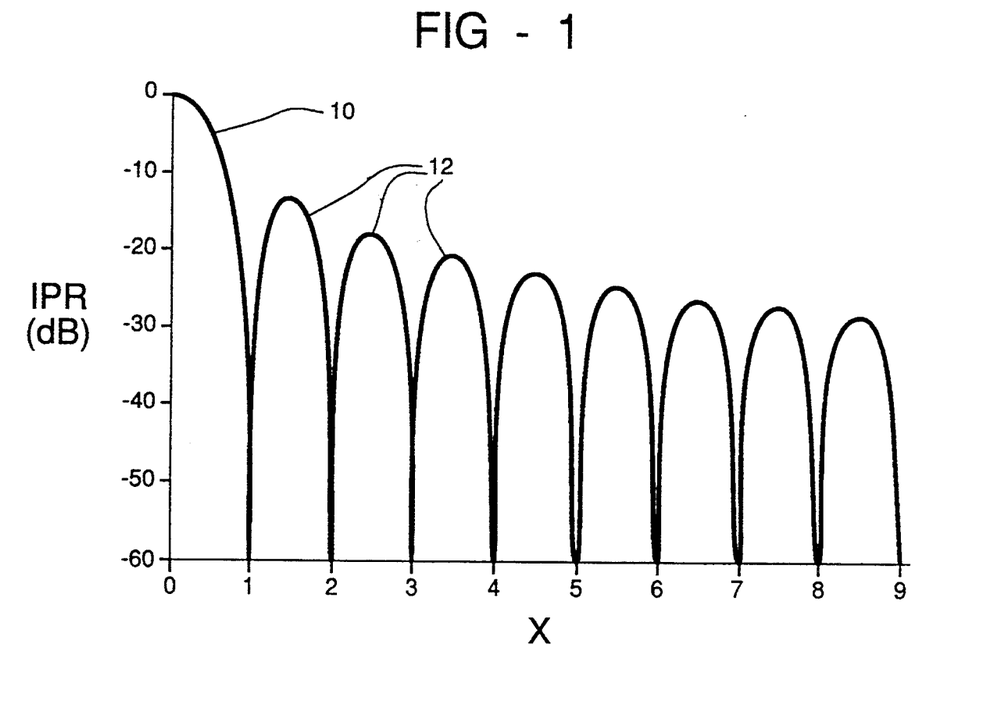
FIG. 1 depicts the impulse response Of performing a Fourier transform on a finite-aperture image.

The Fourier transform of a limited duration sine wave produces a waveform that can be described by a sinc function (FIG. 1). The sinc function has a mainlobe which contains the peak and has a width up to the first zero crossing, and a set of sidelobes comprising the oscillating remainder on both sides of the mainlobe. In radar and some other fields, the composite function of the mainlobe and the sidelobes is termed the impulse response (IPR) of the system. The location of the center of the sinc function is related to the frequency of the sine wave. If there are more than one sine wave present in the signal being analyzed, they will appear in the output at other locations. The resolution is related to the width of the mainlobe. The presence of sidelobes reduces the ability to discriminate between sinc functions.

Figure 2:
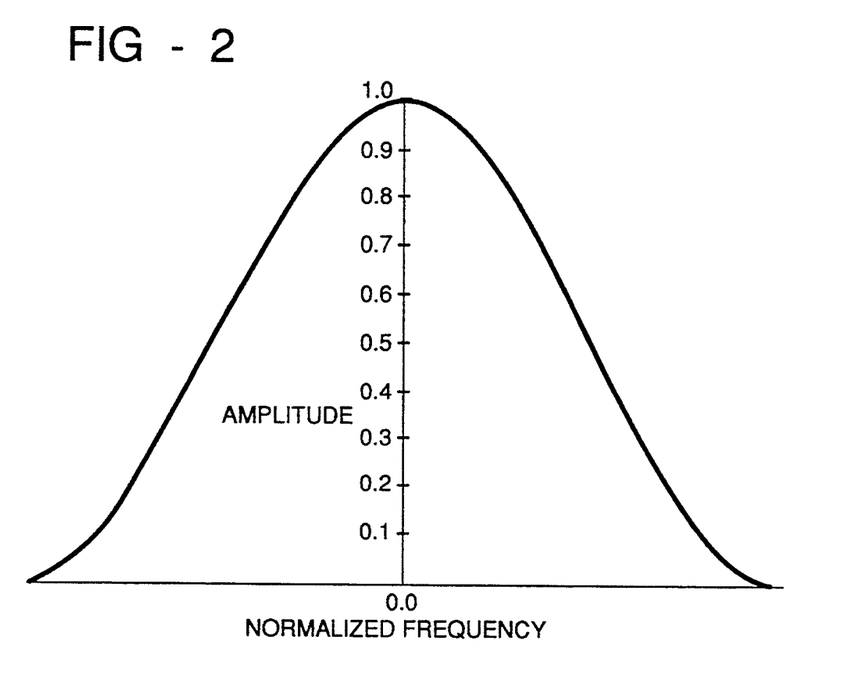
FIG. 2 depicts a Hanning weighting function.

Traditionally, the sidelobes of the impulse response have been reduced by multiplying the signal prior to compression by an amplitude function that is a maximum at the center and tending toward zero at the edges, as typified by a Hanning weighting function shown in FIG. 2. Sidelobe reduction by amplitude multiplication is called "weighting" or, sometimes, "apodization". Unfortunately, employing that kind of apodization to reduce sidelobes also results in the broadening of the mainlobe which degrades the resolution of the system.

Figure 3:
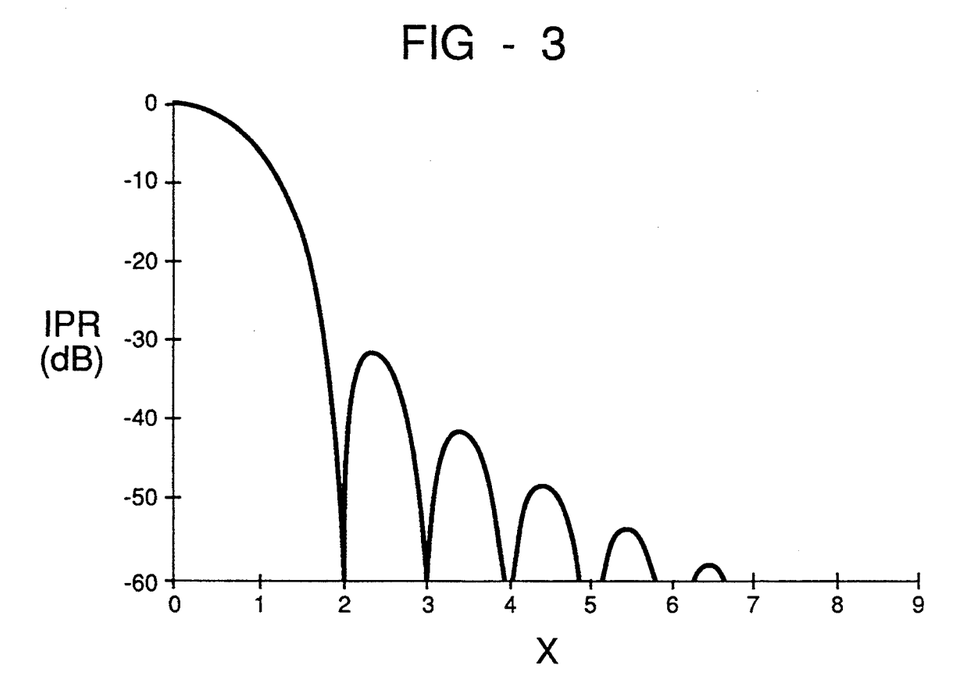
FIG. 3 depicts the impulse response when Hanning weighting function is applied.

One family of apodization functions is termed "cosine-on-pedestal". Hanning (50% cosine and 50% pedestal, as shown in FIG. 2) and Hamming (54% cosine and 46% pedestal) are two of the most popular. Hanning weighting reduces the peak sidelobe from $-13$ dB of the mainlobe's peak to $-32$ dB but it also doubles the mainlobe width (FIG. 3).

The equivalent of apodization can also be performed in the output domain by convolution. In the case of digitally sampled data, convolution is performed by executing the following operation on each point in the sequence: multiply each sample by a real-valued weight which is dependent on the distance from the point being processed.

Any of the cosine-on-pedestal family of apodizations is especially easy to implement by convolution when the transform is of the same length as the data set, i.e., the data set is not padded with zeros before transformation. In this case, the convolution weights are non-zero only for the sample itself and its two adjacent neighbors. The values of the weights vary from [0.5, 1.0, 0.5] in the case of Hanning to [0.0, 1.0, 0.0] in the case of no apodization. Different cosine-on-pedestal apodization functions have different zero crossing locations for the sidelobes. The Hanning function puts the first zero crossing at the location of the second zero crossing of the unweighted impulse response. Not shown in FIGS. 1 and 3, the signs of the IPRs are opposite for all sidelobes when comparing unapodized and Hanning apodized signals.

To improve the process, a method called dual-apodization has been developed. In this method, the output signal is computed twice, once using no apodization and a second time using some other apodization which produces low sidelobes. Everywhere in the output, the two values are compared. The final output is always the lesser of the two. In this way the optimum mainlobe width is maintained while the sidelobes are generally lowered.

An extension to dual apodization is multi-apodization. In this method, a number of apodized outposts are prepared using a series of different apodizations, each of which have zero-crossings at different locations. The final output is the least among the ensemble of output apodized values at each output point. In the limit of an infinite number of apodizations, all sidelobes will be eliminated while the ideal mainlobe is preserved.

The final embodiment of this invention occurred when a method was discovered that could compute, for each sample in a sidelobe region, which of the cosine-on-pedestal functions provided the zero crossing from among the potentially infinite number of possible apodizations. This method is called spatially variant apodization (SVA). The method computes the optimum convolution weight set for each sample using a simple formula based on the value of the sample and two of its neighbors. Under noise free conditions, well separated compressed signals show only the mainlobes, and all sidelobes are removed. Under the usual noisy conditions, the output signal to background ratios are improved and the sidelobes are greatly reduced.

SUMMARY OF THE INVENTION

When a signal of finite duration undergoes a signal compression via a transform, such as a Fourier transform, sidelobes develop that obscure details in the output data. This invention is a method for attenuating or eliminating the sidelobes without compromising the resolution of the signal. The first step is a compression of the signal using little or no apodization. The second step is to determine the convolution weights for each output sample. The center weight is unity. The outer two are the same and are computed as follows: 1) the two adjacent samples are summed, 2) the sum is divided into the value of the center sample, and 3) the resulting value is limited to a specific range depending on the application, e.g. 0 to 0.5. In the final step, the sample is convolved using the computed weight set.

This method has variants depending on the type of compression, the type of signal, and the application. Fourier transforms are a standard method of compressing sine waves but other transforms are also used, including cosine, Hartley and Haddamard. Matched filter compression is also used in the cases in which the signal is not a sine wave but some other expected waveform. In each compression method, one must search for the convolution set that implements a set of apodizations which affect the magnitudes and signs of the sidelobes.

The type of signal can be real or complex, one dimensional or multidimensional. For real-valued functions, there is only one channel to process. Complexed-valued functions have an in-phase (I) channel and a quadrature (Q) channel. Spatially variant apodization can be applied to the I and Q channels independently or can, with a slight modification in the equation, handle the joint I/Q pair.

When the signals are two (or higher) dimensional, there are again several ways to perform the spatially variant apodization. The first is to apodize in one dimension at a time in a serial manner. The second is to apodize each dimension, starting from the same unapodized process. The results of apodizing in the individual dimensions are combined by taking the minimum output among the individual apodizations for each output sample.

In summary, the family of spatially variant apodization methods select a different and optimum apodization at each output position in order to minimize the sidelobes arising from signal compressions of finite data.

DETAILED DESCRIPTION OF THE INVENTION

Spatially variant apodization (SVA) allows each pixel in an image to receive its own frequency domain aperture amplitude weighting function from an infinity of possible weighting functions. In the case of synthetic aperture radar (SAR), for example, SVA effectively eliminates finite-aperture induced sidelobes from uniformly weighted data while retaining nearly all of the good mainlobe resolution and clutter texture of the unweighted SAR image.

FIG. 1 depicts the graph of a sinc function waveform. This serves to model the impulse response of performing a Fourier transform on a set of finite-aperture data. The mainlobe 10 carries the information from the original signal. To maintain the resolution of the image, the mainlobe 10 must not be widened during the apodization of the image. The sidelobes 12 do not carry any information about the original signal. Instead, they serve to obscure the neighboring details which have weaker signal strengths than the sidelobes.

Figure 4:
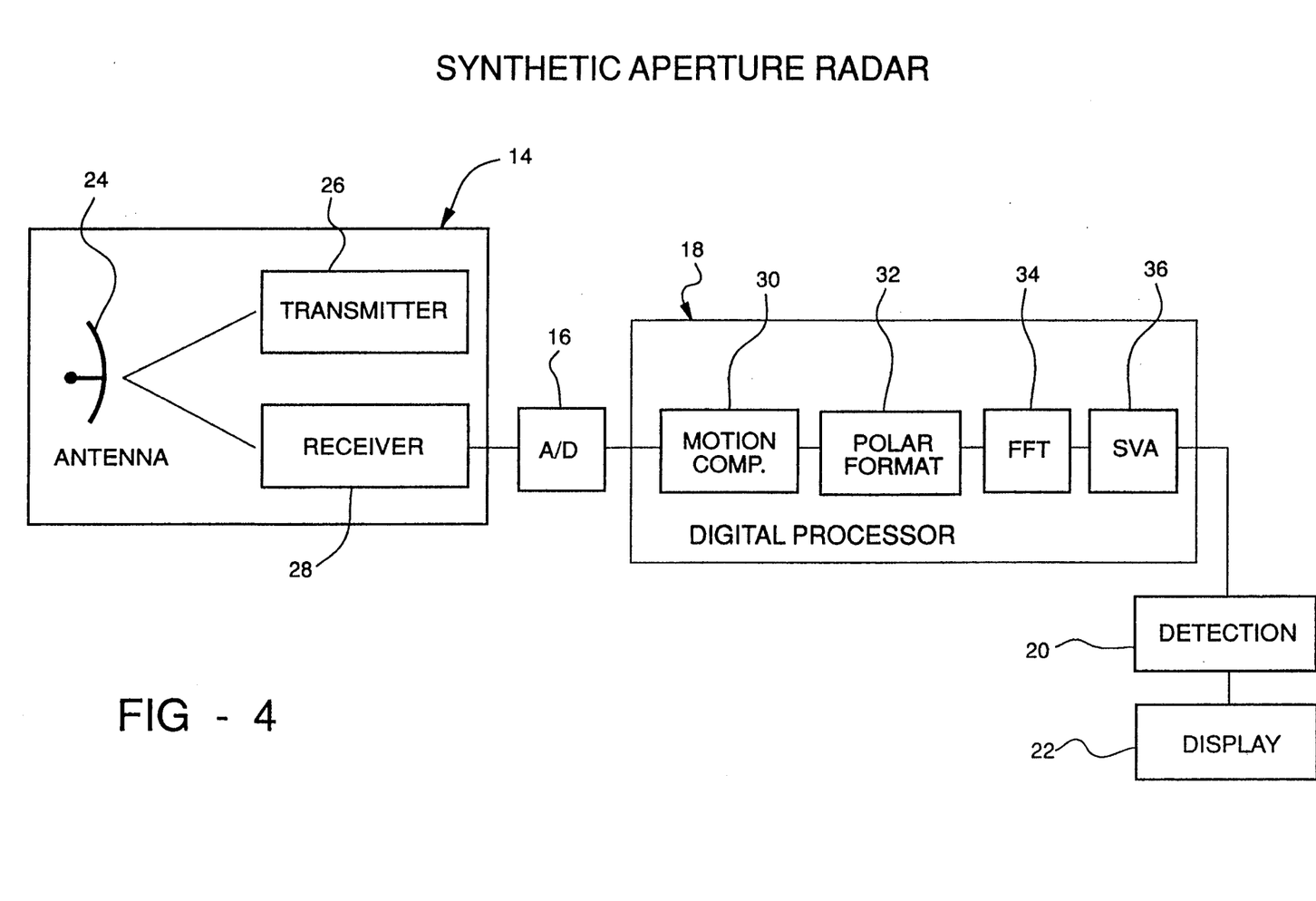
FIG. 4 is a block diagram of a synthetic aperture radar system employing spatially variant apodization.

Spatially variant apodization was developed for synthetic aperture radar in response to the problems inherent to finite aperture systems as described above. However, there are many different embodiments for spatially variant apodization in areas of imagery, digital signal processing, and others. FIG. 4 is a simplified block diagram of a synthetic aperture radar system utilizing spatially variant apodization. The system can be broken into five smaller sections: data acquisition 14, data digitizing 16, digital image formation processing 18, detection 20 and display 22.

Data acquisition 14 for synthetic aperture radar comprises a transmitter 26 to generate a radio frequency signal to be broadcast by an antenna 24. The reflected radio signals returning to the antenna 24 are sent to the receiver, where a complex pair of signals are formed and sent to an analog to digital converter 16.

The analog to digital converter 16 samples and digitizes each signal and passes the data to the digital processor 18. In the digital processor 18, the first function performed is that of motion compensation 30. Since this type of system is used in moving aircraft to survey surface features, the motion of the plane must be taken into consideration so that the image is not distorted. After motion compensation 30, the signals are processed by polar formatting circuitry or algorithms to format the data in such a manner so that a coherent two dimensional image can be formed by a Fourier transform. The next step in digital processing is to transform the data from the frequency domain to the space domain via a Fast Fourier Transform (FFT) 34. It is at this step that sidelobes are produced in the image. The final step in the digital processor 18 is to perform spatially variant apodization 36 on the complex data sets.

Following the digital processing 18, detection 20 takes place to form the final signal which drives the display 22. Detection 20 comprises determining the magnitude of the complex image. From this data a two dimensional image can be displayed on a CRT or on film.

It is well known that cosine-on-pedestal frequency domain weighting functions can be implemented using a 3-point convolver on complex, Nyquist sampled imagery. The family of cosine-on-pedestal weightings range from uniform weighting to Hanning weighting. Hamming weighting is a special case of cosine-on-pedestal which nulls the first sidelobe. Similarly, any unweighted aperture sinc function sidelobe can be nulled using one of the family of cosine-on-pedestal weighting functions.

The spatially variant apodization algorithm has a number of different forms. The derivation for the most basic form is as follows. Let $g(i)$ denote the current sample or pixel, $g(i-1)$ denote the previous sample or pixel, and $g(i+1)$ denote the following sample in one dimension of either the real (I) or imaginary (Q) parts of a uniformly weighted Nyquist-sampled image. Using a 3-point convolver to achieve a given cosine-on-pedestal aperture weighting, $g(i)$ is replaced by $g'(i)$ as follows:

$$g'(i) = w(i)g(i-1) + g(i) + w(i)g(i+1). \qquad (1)$$

This equation is the convolution of $g(i)$ with the sampled impulse response due to a raised-cosine aperture-weighting function. As $w(i)$ varies from 0 to $\frac{1}{2}$, the frequency domain amplitude weighting varies from cosine-on-zero pedestal (Hanning) at $w(i)=\frac{1}{2}$ to uniform weighting at $w(i)=0$. The center convolver weight is always unity because it is desirable to normalize the peak point-target responses for the family of cosine-on-pedestal weightings.

It is desired therefore, to find the $w(i)$ which minimizes $|g'(i)|$ subject to the constraints $0 \leq w(i) \leq \frac{1}{2}$. The unconstrained $w(i)$ that gives the minimum is:

$$w(i) = \frac{-g(i)}{g(i-1) + g(i+1)}. \quad (2)$$

If w(i) in Eq.(2) is substituted into Eq.(1) then g'(i)=0 is the unconstrained solution. Therefore, applying the constraints, g'(i)=0 is the solution wherever $0 \leq w(i) \leq \frac{1}{2}$. However, g'(i) can be nonzero wherever w(i)<0 or w(i)>$\frac{1}{2}$, i.e., $$w(i) = 0 \text{ if } \frac{-g(i)}{g(i-1) + g(i+1)} \leq 0 \quad (3)$$

$$w(i) = \tfrac{1}{2} \text{ if } \frac{-g(i)}{g(i-1) + g(i+1)} \geq \tfrac{1}{2}. \quad (4)$$

Figure 5:
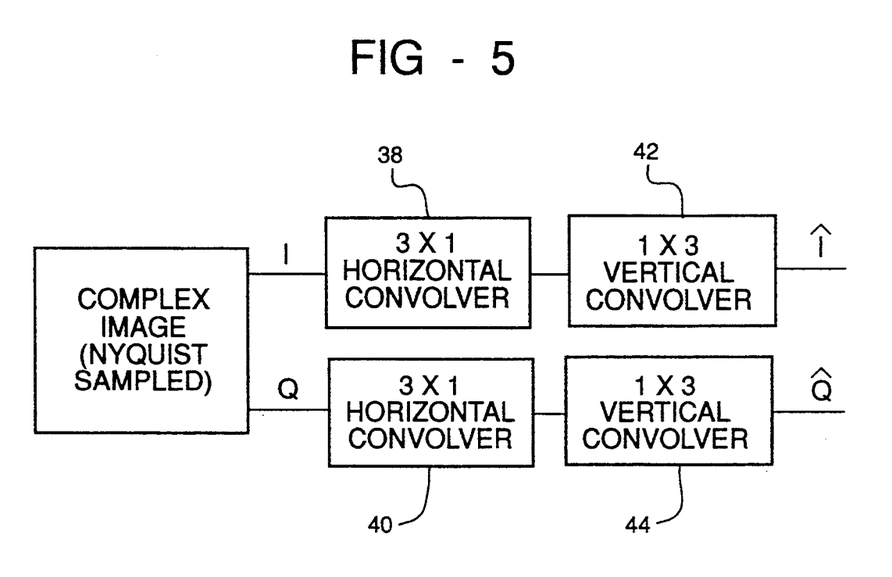
FIG. 5 is a block diagram showing a basic technique for applying a spatially variant apodization algorithm which modifies I and Q separately.

The process given by Eqs. (1)–(4) can be applied according to the block diagram in FIG. 5. The real horizontal convolver 38 and the imaginary horizontal convolver 40 can each be performed sequentially using two parallel processors to produce two modified data sets. Next, the real vertical convolver 42 and the imaginary vertical convolver 44 can each be performed sequentially on the modified data using two parallel processors to create further modified data sets.

Spatially variant apodization can also be formulated by minimizing ($I^2+Q^2$) jointly. The result is one weight applied jointly to both I and Q. Equation (2) becomes:

$$w(i) = \frac{-[I_i(I_{i-1} + I_{i+1}) + Q_i(Q_{i-1} + Q_{i+1})]}{(I_{i-1} + I_{i+1})^2 + (Q_{i-1} + Q_{i+1})^2}. \quad (5)$$

Figure 6:
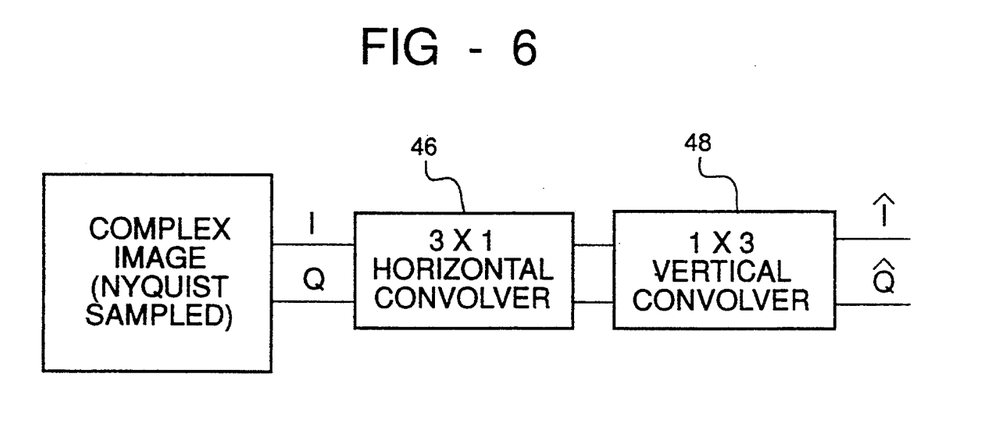
FIG. 6 is a block diagram showing a basic technique for applying a spatially variant apodization algorithm which modifies I and Q jointly.

The block diagram for applying this form of SVA is depicted in FIG. 6. First a horizontal convolver 46 is applied to both components I, Q of the current sample i using the weighting having the form of equation (5) to obtain the modified sample value ($I'_i$, $Q'_i$). The convolver equation is $$(I'_i,Q'_i) = w(i)*(I_{i-1},Q_{i-1}) + (I_i,Q_i) + w(i)*(I_{i+1},Q_{i+1}).$$

Then a vertical convolver 48 is applied to both components of the resultant ($I'_i,Q'_i$) again using a weighting having the form of equation (5) and the same form of convolver equation. Another approach to processing the two dimensional data is to operate both the horizontal and vertical convolvers on the current sample value to calculate two modified values and then select the minimum of the two modified values.

The upper and lower limits for weights as set forth heretofore are theoretical ideals which should deliver the optimal results. However, actual systems which may utilize spatially variant apodization are not ideal systems, and the designers may prefer some result other than the theoretical ideal result. For this reason the invention shall not be limited to only those theoretical limits set forth herein.

The sampling rate for SAR systems is typically not limited to the Nyquist rate. Any integer or non-integer sampling rate may be chosen as a matter of design choice. If the sampling rate is an N integer multiple of the Nyquist rate then the convolver and weight algorithms should utilize the current pixel or sample, g(i), and the Nth neighboring pixels or samples on each side, g(i−N) and g(i+N). For cases calculating I and Q jointly, the weight is determined using the following expression:

$$w(i) = \frac{-[I_i(I_{i-N} + I_{i+N}) + Q_i(Q_{i-N} + Q_{i+N})]}{(I_{i-N} + I_{i+N})^2 + (Q_{i-N} + Q_{i+N})^2}$$

denoted w(i) where $I_i$ and $Q_i$ represent the current real and imaginary components, respectively, of the current sample, $I_{i-N}$ and $Q_{i-N}$ represent the real and imaginary components, respectively, of the Nth sample preceding the current sample, and $I_{i+N}$ and $Q_{i+N}$ represent the real and imaginary components, respectively, of the Nth sample following the current sample. The usual limits apply to this case except that, in order to obtain good results when using sampling rates that are non-integer multiples of the Nyquist rate, the upper limit for the convolver weight must be modified. Let p be the percent zero-padding in the system. The required maximum for w(i) can be calculated in the following manner:

$$\text{Max } w(i) = \frac{1}{2\sin(\pi/2 - p\pi)}$$

Finally, a new complex value, ($I'_i,Q'_i$), for the current sample, ($I_i,Q_i$), is determined according to the expression:

$$(I'_i,Q'_i) = w(i)*(I_{i-N},Q_{i-N}) + (I_i,Q_i) + w(i)*(I_{i+N},Q_{i+N}).$$

The techniques that have been addressed here have been two dimensional. The algorithm is applied to only one dimension at a time. As few as one dimension may be processed using spatially variant apodization. The techniques may also be expanded to as include as many dimensions as is necessary. As stated above, the convolving process for more than one dimension can be employed serially with each convolution operating on the resultant of the previous convolution, or alternatively each convolution can operate on the initial samples and the minimum value selected.

Figure 7:
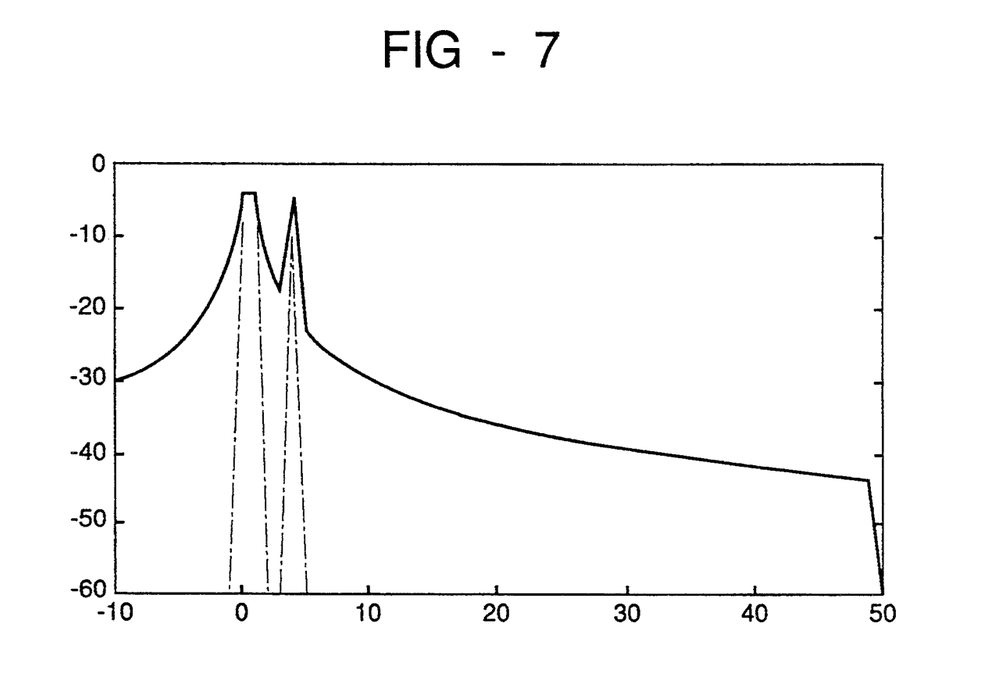
FIG. 7 illustrates the effect of the SVA algorithm on a data set having two peaks.

FIG. 7 illustrates the effect of the SVA algorithm on a data set having two peaks. The solid line is the sum of two sincs separated by 3.5 samples. The output of the SVA algorithm is shown in the dashed line which reveals the two distinct peaks with no sidelobes and no broadening of the mainlobes. The same result was reached using either the independent treatment of I and Q, or the joint treatment.

Another embodiment of the method of minimizing I and Q jointly, uses complex values of the data in the convolver equation and achieves better suppression of the sidelobes. In this method the weight is expressed by $$w(i) = \frac{-[I^2(i) + Q^2(i)]}{I(i)[I(i-1) + I(i+1)] + Q(i)[Q(i-1) + Q(i+1)]}$$

subject to the constraints
 if w(i)<$W_{min}$; g'(i)=[I(i)+jQ(i)][1−$w_{min}$/w(i)];
 if $w_{min} \leq$ w(i) $\leq w_{max}$; g'(i)=0; and
 if w(i)>$w_{max}$; g'(i)=[I(i)+jQ(i)][1−$w_{max}$/w(i)].
Thus the form of the convolver equation to determine the modified point g' as well as the value of the weight w(i) depends on the range of the weight. In the ideal case the upper weight limit $w_{max}=\tfrac{1}{2}$ and the lower weight limit $w_{min}=0$ as in the previous embodiments.

What is claimed is:

1. In signal processing of finite data sequences having at least one mainlobe and a plurality of sidelobes resulting from the transformation of finite data sequences from the frequency domain, the method of attenuating the sidelobes without widening the mainlobe comprising the steps of:

acquiring a finite set of discrete data samples in the frequency domain;

transforming the set to space domain to produce a transformed set of data samples which includes at least one mainlobe and a plurality of sidelobes;

determining weights for each sample as a function of the negative of the current sample divided by the sum of the neighboring samples where the weight is limited to a predetermined range;

attenuating the sidelobes by adding to each sample the product of the determined weight and the sum of neighboring samples; and using the waveform with attenuated sidelobes in an image-processing system.

2. The invention as defined in claim 1 wherein the discrete data is acquired by sampling at the Nyquist frequency and includes the step of limiting the weight to a prescribed range which includes a set of values between zero and one half.

3. The invention as defined in claim 1 where the samples are complex numbers having real and imaginary components and wherein said processes of determining weights and attenuating the sidelobes are performed for the real and imaginary components of the data independently.

4. The method of signal processing for apodization of sidelobes without widening mainlobes comprising the steps of:

acquiring a finite set of discrete data in the frequency domain sampled at the Nyquist frequency;

transforming the finite set of data to a space domain representation of the sampled data including one set of real data and one set of imaginary data, the transformed data having at least one mainlobe and a plurality of sidelobes associated with each mainlobe, for Nyquist sampled data, selecting a first limit not greater than zero or a negative value and a second limit of at least one half;

for each set of real and imaginary data calculating a modified set of frequency domain data by determining weights for each sample by choosing the value of the negative of the current sample divided by the sum of the preceding sample and the following sample when that value is between the limits, at the first limit when that value is less than or equal to the first limit, and at the second limit when that value is greater than or equal to the second limit;

determining a new value for the current sample by adding the product of the weight and the sum of the preceding sample and the following sample to the current sample; and using the waveform with attenuated sidelobes in an image-processing system.

5. The method of claim 4 wherein the data represents a first and second dimension additionally comprising the steps of:

calculating a modified set of frequency domain data for the second dimension for real and imaginary data to determine a second new value for the current sample; and selecting the minimum of the new values for each current sample to determine a final modified set of data for the second dimension.

6. The method of claim 4 wherein the data represents a first and second dimension additionally comprising the steps of:

for each set of real and imaginary data calculating a second modified set of frequency domain data in the second dimension wherein each modified sample has neighboring samples in the second dimension by determining weights in the second dimension for each sample in the modified set of frequency domain data by choosing the value the negative of the current sample divided by the sum of the neighboring samples when that value between said limits, at zero or the first limit when that value is less than or equal to the first limit, and at the second limit when that value is greater than or equal to the second limit;

determining a new value for the modified value of the current sample by adding the product of the weight and the sum of the neighboring modified samples to the modified value of the current sample.

7. The method of signal processing for apodization of sidelobes without widening mainlobes comprising the steps of:

acquiring a finite set of discrete data sampled at some N integer multiple of the Nyquist frequency;

obtaining a frequency domain representation of the sampled data including one set of real data and one set of imaginary data;

selecting an upper limit of at least one half;

selecting a lower limit of zero or less;

determining weights for each real sample by choosing the value of the negative of the current sample divided by the sum of the Nth sample preceding the current sample and the Nth sample following the current sample when that value is between said limits, zero or the lower limit when that value is less than or equal to the lower limit and at the upper limit when that value is greater than or equal to said upper limit;

determining a new value for the current real sample by adding the product of the weight and the sum of the Nth sample preceding the current sample and the Nth sample following the current sample to the current sample;

performing the three preceding steps on the imaginary data set; and using the new real and imaginary values in an image-processing system.

8. The method of signal processing for apodization of sidelobes without widening mainlobes comprising the steps of:

acquiring a finite set of discrete data which is sampled at a non-Nyquist frequency and P percent zero-padded;

obtaining a frequency domain representation of the sampled data including one set of real data and one set of imaginary data;

selecting a lower limit of zero or less;

selecting an upper limit not less than the value of the following expression: $1/[2* \sin(\pi/2 - P*\pi)]$;

for each set of real and imaginary data calculating a modified set of space domain data by determining weights for each sample by choosing the value of the negative of the current sample divided by the sum of the preceding sample and the following sample when that value is between the lower limit and the upper limit, zero or the lower limit when that value is less than or equal to the lower limit, and at the upper limit when that value is greater than or equal to the upper limit;

determining a new value for the current sample by adding the product of the weight and the sum of the preceding sample and the following sample to the current sample; and using the current sample in an image-processing system.

9. The method of signal processing for apodization of sidelobes without widening mainlobes comprising the steps of:

acquiring a finite set of discrete data sampled at the Nyquist frequency;

obtaining a frequency domain representation of the sampled data including one set of real data, denoted by I, and one set of imaginary data, denoted by Q;

selecting an upper limit of at least one half for Nyquist sampled data and a lower limit of zero or less;

determining weights for each sample by choosing the value of the expression:

$$\frac{-[I_i(I_{i-1} + I_{i+1}) + Q_i(Q_{i-1} + Q_{i+1})]}{(I_{i-1} + I_{i+1})^2 + (Q_{i-1} + Q_{i+1})^2}$$

denoted w(i) where $I_i$ and $Q_i$ represent the current real and imaginary components, respectively, of the current sample, $I_{i-1}$ and $Q_{i-1}$ represent the real and imaginary components, respectively, of the preceding sample, and $I_{i+1}$ and $Q_{i+1}$ represent the real and imaginary components, respectively, of the following sample;

when that value is between the lower limit and the upper limit, zero or the lower limit when that value is less than or equal to the lower limit, and at the value of the upper limit when that value is greater than or equal to said upper limit;

determining a modified complex value, $(I'_i, Q'_i)$ for the current sample, $(I_i, Q_i)$ according to the expression:

$$(I'_i, Q'_i) = w(i)*(I_{i-1}, Q_{i-1}) + (I_i, Q_i) + w(i)*(I_{i+1}, Q_{i+1});$$

and using the modified complex value in an image-processing system.

10. The method of claim 9 wherein the data represents a first and second dimension additionally comprising the steps of:

determining weights and a new complex value in the second dimension for each sample according to an algorithm employing expressions of the form set forth in claim 9.

11. The method of claim 10 wherein the step of determining weights and a new complex value in the second dimension comprises operating on the modified complex value.

12. The method of claim 10 wherein the step of determining weights and a new complex value in the second dimension comprises operating on the unapodized samples, and then selecting the minimum of said modified complex value and said new complex value.

13. The method of signal processing for apodization of sidelobes without widening mainlobes comprising the steps of:

acquiring a finite set of discrete data sampled at some N integer multiple of the Nyquist frequency;

obtaining a frequency domain representation of the sampled data including one set of real data, denoted by I, and one set of imaginary data, denoted by Q;

selecting an upper limit of at least one half for Nyquist-multiple sampled data;

selecting a lower limit of zero or less;

determining weights for each sample by value of the expression:

$$\frac{-[I_i(I_{i-N} + I_{i+N}) + Q_i(Q_{i-N} + Q_{i+N})]}{(I_{i-N} + I_{i+N})^2 + (Q_{i-N} + Q_{i+N})^2}$$

denoted w (i) where $I_i$ and $Q_i$ represent the current real and imaginary components, respectively, of the current sample, $I_{i-N}$ and $Q_{i-N}$ represent the real and imaginary components, respectively, of the Nth sample preceding the current sample, and $I_{i+N}$ and $Q_{i+N}$ represent the real and imaginary components, respectively, of the Nth sample following the current sample;

when that value is between the lower limit and the upper limit, zero or the lower limit when that value is less than or equal to the lower limit, and the value of the upper limit when that value is greater than or equal to said upper limit;

determining a new complex value, $(I'_i, Q'_i)$, for the current sample, $(I_i, Q_i)$ according to the expression:

$$(I'_i, Q'_i) = w(i)*(I_{i-N}, Q_{i-N}) + (I_i, Q_i) + w(i)*(I_{i+N}, Q_{i+N});$$

and using the new complex value in an image-processing system.

14. The method of signal processing for apodization of sidelobes without widening mainlobes comprising the steps of:

acquiring a finite set of discrete data which is sampled at a non-Nyquist frequency and zero-padded at some percentage as denoted by P;

obtaining a frequency domain representation of the sampled data including one set of real data, denoted by I, and one set of imaginary data, denoted by Q;

selecting a lower limit of zero or less and an upper limit not less than the value of the following expression: $1/[2* \sin(\pi/2 - P*\pi)]$;

determining weights for each sample by choosing the value of the expression:

$$\frac{-[I_i(I_{i-1} + I_{i+1}) + Q_i(Q_{i-1} + Q_{i+1})]}{(I_{i-1} + I_{i+1})^2 + (Q_{i-1} + Q_{i+1})^2}$$

denoted w(i) where $I_i$ and $Q_i$ represent the current real and imaginary components, respectively, of the current sample, $I_{i-1}$ and $Q_{i-1}$ represent the real and imaginary components, respectively, of the preceding sample, and $I_{i+1}$ and $Q_{i+1}$ represent the real and imaginary components, respectively, of the following sample;

when that value is between zero and said upper limit, zero or the lower limit when that value is less than or equal to the lower limit, and the value of the upper limit when that value is greater than or equal to the upper limit; and determining a new complex value, $(I_i', Q_i')$, for each current sample, $(I_i, Q_i)$ according to the expression:

$$(I_i', Q_i') = w(i)^*(I_{i-1}, Q_{i-1}) + (I_i, Q_i) + w(i)^*(I_{i+1}, Q_{i+1})$$

to derive two modified sets of space domain data.

15. The method of signal processing for apodization of sidelobes without widening mainlobes comprising the steps of:

acquiring a finite set of discrete complex data samples;

obtaining a frequency domain representation of the complex data samples g(i) including real data denoted by I and imaginary data denoted by Q;

determining weights for each sample by the expression:

$$w(i) = \frac{-[I^2(i) + Q^2(i)]}{I(i)[I(i-1) + I(i+1)] + Q(i)[Q(i-1) + Q(i+1)]};$$

selecting a lower limit $w_{min}$ and an upper limit $w_{max}$ for the weights $w(i)$;

determining a modified complex value $g'(i)$ for each sample where $$g'(i) = [I(i) + jQ(i)][1 - w_{min}/w(i)] \text{ if } w(i) < w_{min};$$

$$g'(i) = 0 \text{ if } w_{min} \leq w(i) \leq w_{max};$$

and $$g'(i) = [I(i) + jQ(i)][1 - w_{max}/w(i)] \text{ if } w(i) > w_{max}.$$

16. In a synthetic aperture radar system having an image output, the method of enhancing the image comprising the steps of:

receiving radar signals reflected from a scene, digitizing the signals, and processing the digital signals to form a two dimensional array of image elements;

the processing step including Fourier transforming the digital signals in two dimensions to form a complex image representation in the space domain containing main lobes and a diffraction pattern comprising side lobes;

apodizing the complex image representation in each dimension to substantially remove the side lobes without affecting the main lobes; and generating an image from the apodized image representation.

17. The invention as defined in claim 16 wherein the step of apodizing the image representation in each dimension includes apodizing by convolving each unapodized sample in each dimension and combining the results by selecting the minimum output for each sample.

18. The invention as defined in claim 16 wherein the complex image representation comprises sets of real and imaginary data samples, and wherein the step of apodizing the complex image representation comprises the steps of:

for each set of real and imaginary data samples determining weights for each sample as a function of the negative of the current sample divided by the sum of the neighboring samples where the weight is limited to a prescribed range, and adding to each sample the product of the determined weight and the sum of neighboring samples to obtain modified samples.

19. The invention as defined in claim 18 wherein the digital signals are acquired by sampling at the Nyquist frequency, and the step of determining weights includes:

limiting the weight to a prescribed range which includes a set of values between zero and one half.

20. The invention as defined in claim 18 wherein the complex image representation comprises sets of real and imaginary data samples, and wherein the step of apodizing the complex image representation comprises the steps of:

for each set of real and imaginary data calculating a modified set of data by selecting a first limit of zero or less and a second limit of at least one half, for Nyquist sampled data;

determining weights for each sample by choosing the value of the negative of the current sample divided by the sum of the preceding sample and the following sample when that value is between the limits, at zero or the first limit when that value is less than or equal to the first limit, and at the second limit when that value is greater than or equal to the second limit; and determining a new value for the current sample by adding the product of the weight and the sum of the preceding sample and the following sample to the current sample.

21. The invention as defined in claim 18 wherein the complex image representation comprises sets of real and imaginary data samples derived from data sampled at a non-Nyquist frequency and P percent zero-padded, and wherein the step of apodizing the complex image representation comprises the steps of:

selecting a first limit of zero or less and a second limit not less than the value of the following expression: $1/[2^* \sin(\pi/2 - P^*\pi)]$;

for each set of real and imaginary data calculating a modified set of space domain data by determining weights for each sample by choosing the value of the negative of the current sample divided by the sum of the preceding sample and the following sample when that value is between said limits, at zero or the first limit when that value is less than or equal to the first limit, and at the second limit when that value is greater than or equal to the second limit; and determining a new value for the current sample by adding the product of the weight and the sum of the preceding sample and the following sample to the current sample.

22. The invention as defined in claim 16 wherein the complex image representation comprises sets of real and imaginary data samples denoted I(i) and Q(i), respectively, and wherein the step of apodizing the complex image representation comprises the steps of:

determining weights for each sample by the expression:

$$w(i) = \frac{-[I^2(i) + Q^2(i)]}{I(i)[I(i-1) + I(i+1)] + Q(i)[Q(i-1) + Q(i+1)]};$$

selecting a lower limit $w_{min}$ and an upper limit $w_{max}$ for the weights $w(i)$; and determining a modified complex value $g'(i)$ for each sample where $g'(i) = [I(i) + jQ(i)] [1 - w_{min}/w(i)]$ if $w(i) < w_{min}$;
$g'(i) = 0$ if $w_{min} \leq w(i) \leq w_{max}$; and
$g'(i) = [I(i) + jQ(i)] [1 - w_{max}/w(i)]$ if $w(i) > w_{max}$.

23. The method of claim 1, wherein the step of using the samples in an image-formation system includes using the samples in a radar system.

24. A signal processing system for attenuating the sidelobes resulting from the transformation of a finite data sequence from the frequency domain without widening the main lobe, the system comprising:

means for acquiring a finite set of discrete data samples in the frequency domain;

means for transforming the set to the space domain to produce a transformed set of data samples which includes at least one mainlobe and a plurality of sidelobes;

means for determining weights for each sample as a function of the negative of the current sample divided by the sum of the neighboring samples, where the weight is the limited to a predetermined range; and means for attenuating the sidelobes by adding to each sample the product of the determined weight and the sum of neighboring samples.

25. The system according to claim 24, wherein the means for acquiring the samples in the frequency domain does so at the Nyquist frequency and wherein the means for determining weights for each sample limits each weight to a prescribed range between values of 0 and $\frac{1}{2}$.

26. The system according to claim 24, wherein the samples are complex numbers, and the means for determining the weights of each sample and attenuation of sidelobes operate upon the real and imaginary components of the data independently.

* * * * *